(12) United States Patent
Long et al.

(10) Patent No.: US 9,240,656 B1
(45) Date of Patent: Jan. 19, 2016

(54) CONNECTOR ASSEMBLY WITH CABLE BUNDLE

(71) Applicant: Tyco Electronics Corporation, Berwyn, PA (US)

(72) Inventors: Richard Long, Columbia, PA (US); Alex Michael Sharf, Harrisburg, PA (US); Jeffrey Stewart Simpson, Mechanicsburg, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 0 days.

(21) Appl. No.: 14/471,676

(22) Filed: Aug. 28, 2014

(51) Int. Cl.
*H01R 9/03* (2006.01)
*H01R 13/6581* (2011.01)
*H01R 13/6593* (2011.01)
*H01R 13/658* (2011.01)
*H01R 13/6583* (2011.01)

(52) U.S. Cl.
CPC ............ *H01R 13/6581* (2013.01); *H01R 9/038* (2013.01); *H01R 13/658* (2013.01); *H01R 13/6583* (2013.01); *H01R 13/6593* (2013.01); *H01R 13/65802* (2013.01)

(58) Field of Classification Search
CPC .................. H01R 13/65802; H01R 13/13658; H01R 9/038; H01R 13/6583; H01R 13/658
USPC ..................... 439/607.41, 607.28, 607.3, 927, 439/607.17–607.19
See application file for complete search history.

(56) References Cited

U.S. PATENT DOCUMENTS

| | | | | |
|---|---|---|---|---|
| 3,322,885 | A * | 5/1967 | May et al. ........................ | 174/78 |
| 3,375,483 | A * | 3/1968 | Phillips .......................... | 439/579 |
| 3,744,128 | A * | 7/1973 | Fisher et al. .................... | 29/858 |
| 4,820,201 | A * | 4/1989 | Van Brunt et al. .......... | 439/607.3 |
| 4,830,628 | A * | 5/1989 | Dyson et al. ................... | 439/584 |
| 5,281,762 | A * | 1/1994 | Long et al. ...................... | 174/78 |
| 6,323,430 | B1 * | 11/2001 | Finona .......................... | 174/135 |
| 6,672,909 | B2 * | 1/2004 | Dewdney et al. ............. | 439/787 |
| 6,705,897 | B2 | 3/2004 | Chen et al. | |
| 7,435,132 | B1 * | 10/2008 | Fong et al. ..................... | 439/497 |
| 8,506,331 | B2 * | 8/2013 | Wu .......................... | 439/607.18 |
| 8,827,569 | B2 * | 9/2014 | Yamada .......................... | 385/56 |
| 8,992,249 | B2 * | 3/2015 | Kobayashi et al. ........... | 439/548 |
| 2005/0026500 | A1 | 2/2005 | Ji et al. | |
| 2007/0238358 | A1* | 10/2007 | Akino .......................... | 439/610 |
| 2008/0132112 | A1* | 6/2008 | Nagata et al. ................. | 439/499 |
| 2011/0235977 | A1* | 9/2011 | Yamada .......................... | 385/76 |
| 2011/0250792 | A1 | 10/2011 | Whiteman, Jr. et al. | |
| 2012/0064762 | A1* | 3/2012 | Muroi et al. ................... | 439/578 |
| 2013/0043069 | A1* | 2/2013 | Okuyama ..................... | 174/659 |

* cited by examiner

*Primary Examiner* — Neil Abrams
*Assistant Examiner* — Travis Chambers (57) ABSTRACT

A connector assembly includes a cable bundle, a backshell, and a conductive gasket. The cable bundle includes a plurality of cables. The cables each have at least one inner conductor, a grounding element, and a cover layer that surrounds the at least one inner conductor and the grounding element. The backshell has walls defining a cavity. The cavity receives a terminating end of the cable bundle. The backshell has a cable end. The cable bundle extends from the backshell through a cable opening at the cable end. The conductive gasket is held within the cavity of the backshell at least proximate to the cable opening. The conductive gasket is electrically connected to the backshell. The conductive gasket extends between the cables of the cable bundle. The conductive gasket engages the grounding elements of the cables to provide electrical current paths between each of the cables and the backshell.

20 Claims, 6 Drawing Sheets

FIG. 9

CONNECTOR ASSEMBLY WITH CABLE BUNDLE

BACKGROUND OF THE INVENTION

The subject matter herein relates generally to connector assemblies, and more particularly to connector assemblies with cable bundles.

An electrical interconnection between devices is typically made by joining together complementary electrical connectors that are attached to the devices. One application environment that uses such electrical connectors is in high speed, differential electrical systems, such as those common in the telecommunications or computing environments. In a traditional approach, two circuit boards are interconnected with one another in a backplane and a daughter board configuration. However, similar types of connectors are also being used in cable connector to board connector applications. With the cable connector to board configuration, one connector, commonly referred to as a header, is board mounted and includes a plurality of signal contacts which connect to conductive traces on the board. The other connector, commonly referred to as a cable connector or a receptacle, includes a plurality of contacts that are connected to individual wires in one or more cables of a cable bundle. The receptacle mates with the header to interconnect the board with the cables so that signals can be routed therebetween.

With the ongoing trend toward smaller, faster, and higher performance electrical components such as processors used in computers, routers, switches, etc., it has become increasingly desirable for the electrical interfaces along the electrical paths to also operate at higher frequencies and at higher densities with increased throughput. For example, performance demands for video, voice and data drive input and output speeds of connectors within such systems to increasingly faster levels. Because of the environments that such electrical connectors are used in, the electrical connectors may generate and/or be subjected to various levels of electromagnetic interference (EMI) or radiofrequency interference (RFI) emitted from the electrical connectors and/or from external sources, such as electronic devices in the vicinity of the electrical connectors. The EMI and/or RFI may interrupt, obstruct, or otherwise degrade or limit the effective performance of the electrical connectors or other electronic devices in the vicinity of the electrical connectors.

Typically the electrical connectors include a backshell that provides shielding from EMI and/or RFI and prevents EMI and/or RFI from being emitted into and/or out of the enclosure of the backshell. The backshell is a metal part that surrounds the cables of the cable connector. However, the cables extend from the backshell through one or more holes, and the one or more holes provide a break in the shielding where EMI and/or RFI leakage may occur. In some known connector assemblies, the cable bundle includes a bulk cable shield that surrounds the cables. The bulk cable shield mechanically and electrically connects to the backshell to extend the shielding around the cables outside of the backshell. However, the bulk cable shield typically has a large geometry and couples to the backshell at only a single location. Therefore, if the connection between the bulk cable shield and the backshell were to fail, a significant shielding problem would result. Furthermore, the cost of a bulk cable shield, outer jacket, and any other outer layers of the cable bundle surrounding the cables may be prohibitive, especially for long distances between electrical connectors and devices.

A need remains for a connector assembly that provides better shielding of the cables of a cable bundle and better EMI and/or RFI containment within the backshell than prior art devices.

BRIEF DESCRIPTION OF THE INVENTION

In one embodiment, a connector assembly is provided that includes a cable bundle, a backshell, and a conductive gasket. The cable bundle includes a plurality of cables. The cables each have at least one inner conductor, a grounding element, and a cover layer that surrounds the at least one inner conductor and the grounding element. The backshell has walls defining a cavity. The cavity is configured to receive a terminating end of the cable bundle. The backshell has a cable end. The cable bundle extends from the backshell through a cable opening at the cable end. The conductive gasket is held within the cavity of the backshell at least proximate to the cable opening. The conductive gasket is electrically connected to the backshell. The conductive gasket extends between the cables of the cable bundle. The conductive gasket engages the grounding elements of the cables to provide electrical current paths between each of the cables and the backshell.

In another embodiment, a connector assembly is provided that includes a backshell, a cable connector, a cable bundle, and a conductive matrix. The backshell has walls defining a cavity. The backshell has a cable end that defines a cable opening and a mounting end that defines a connector opening. The cable connector is within the cavity of the backshell. The cable connector has a mating interface that extends at least partially through the connector opening. The cable bundle includes a plurality of cables. The cable bundle has a terminating end within the cavity that terminates to the cable connector. The cables of the cable bundle are spaced apart from each other within the cavity and extend parallel to a cable axis. The cable bundle extends from the backshell through the cable opening. The conductive matrix is held within the cavity of the backshell at least proximate to the cable opening. The conductive matrix extends between the walls of the backshell along a plane transverse to the cable axis. The conductive matrix engages the cables and fills voids between the cables to enclose the cables and seal the cavity.

DETAILED DESCRIPTION OF THE INVENTION

Figure 1:
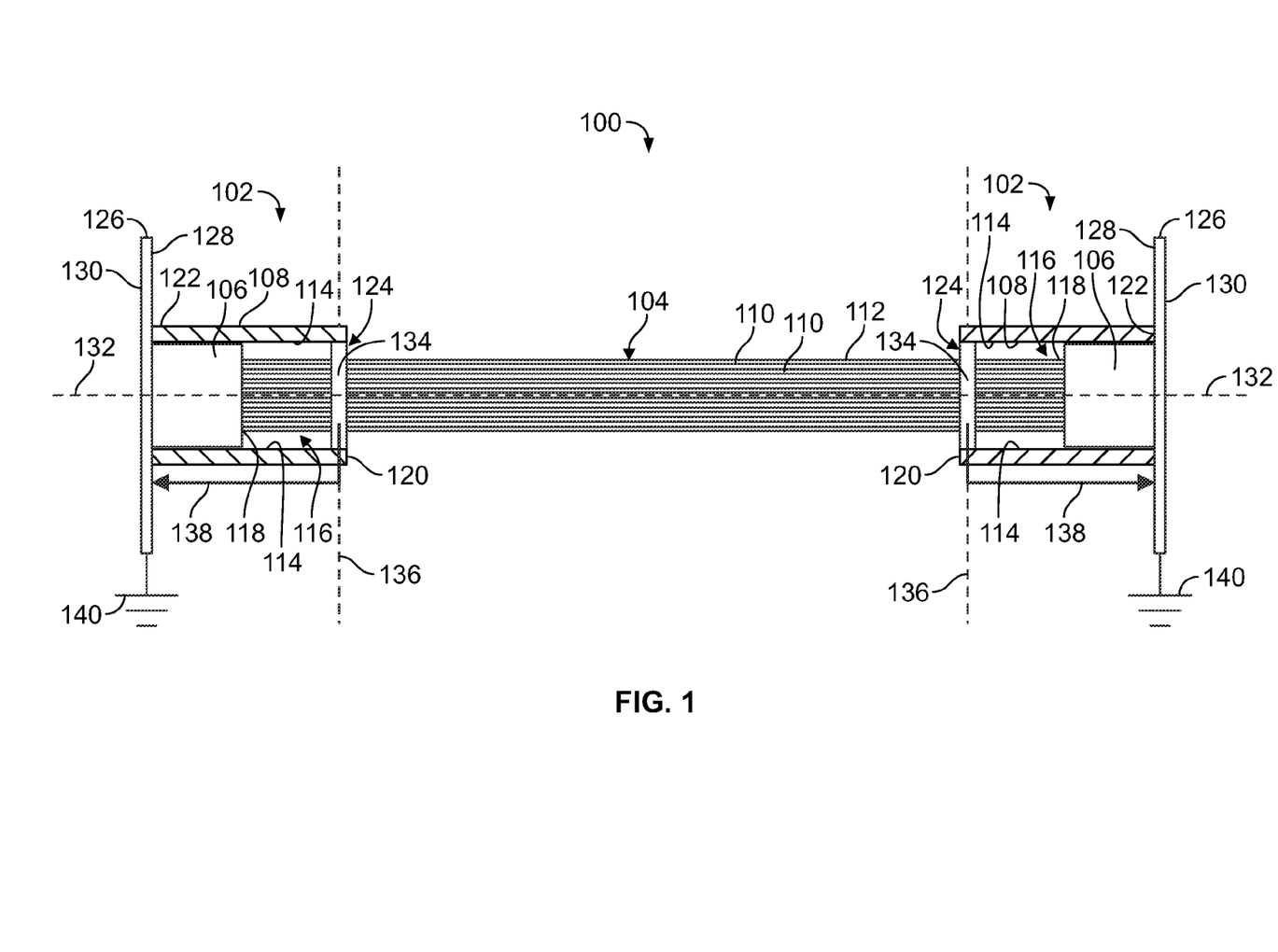
FIG. 1 is a schematic diagram of a cable connector system formed in accordance with an exemplary embodiment.

FIG. 1 is a schematic diagram of a cable connector system 100 formed in accordance with an exemplary embodiment.

The cable connector system 100 includes a set of two connector assemblies 102 that are linked together by a shared cable bundle 104. The two connector assemblies 102 may have similar or identical features and components, such that the following description of the features and components of one of the connector assemblies 102 applies to both connector assemblies 102. The connector assemblies 102 are each able to be mated with a corresponding mating connector assembly (not shown) to create a differential connector system. The connector assemblies 102 optionally may represent receptacle connector assemblies that mate to complementary plug mating connector assemblies. Alternatively, the connector assemblies 102 are plug connector assemblies and the mating connectors are receptacle connector assemblies. While the receptacle connector assemblies 102 will be described with reference to high speed, differential cable connectors, it is to be understood that the benefits herein described are also applicable to other connectors in alternative embodiments. The following description is therefore provided for purposes of illustration, rather than limitation, and is but one potential application of the subject matter herein.

The connector assemblies 102 each include the cable bundle 104, a cable connector 106, and a backshell 108. The cable bundle 104 includes a plurality of cables 110. The cables 110 each have at least one inner conductor 204 (shown in FIG. 4) that conveys signals between the connector assemblies 102. The cables 110 also have a grounding element 208 (shown in FIG. 5) and a cover layer 112 that surrounds the at least one inner conductor 204 and the grounding element 208. The cover layer 112 provides electrical insulation and/or protection from abrasions. The backshell 108 of each connector assembly 102 has walls 114 that define a cavity 116. The backshell 108 also has a cable end 120 and a mounting end 122. The cable end 120 defines a cable opening 124. The cavity 116 receives a terminating end 118 of the cable bundle 104. The cables 110 within the cavity 116 may be spaced apart from each other. The cables 110 may extend generally parallel to a cable axis 132, at least within the cavity 116. The cable bundle 104 extends from the backshell 108 through the cable opening 124. Outside of the backshell 108, the cables 110 of the cable bundle 104 between the two backshells 108 may be exposed to the environment, as shown in FIG. 1. For example, in an embodiment, the cables 110 are not commonly surrounded by various layers to define a single bulk cable. In other embodiments, however, the cables 110 may be wrapped in a bulk cable shield, an outer jacket, and/or the like.

The cable connector 106 is disposed within the cavity 116 of the backshell 108. The terminating end 118 of the cable bundle 104 terminates to the cable connector 106 within the cavity 116. In the illustrated embodiment, the backshells 108 are each mounted to a panel 126. The panel 126 may be part of an outer cover of an electrical device, such as a server. For example, the connector assemblies 102 may be used to provide an electrical bus between servers, line cards, and the like within a single device or between devices. The connector assemblies 102 may, for example, function similar to a backplane on a printed circuit board. The panel 126 has an inner side 128 and an outer side 130. The mounting end 122 of the backshell 108 is mounted to the inner side 128. The panel 126 may have an opening (not shown) that permits the mating connector assembly to mate to the cable connector 106 from the outer side 130 of the panel 126. In an alternative embodiment, at least one of the backshells 108 is integral to the respective panel 126 that the backshell 108 is mounted to. For example, the backshell 108 and the panel 126 may be parts of a larger electronic device, such as integral parts of a shielded enclosure for the electronic device.

In an exemplary embodiment, the connector assemblies 102 also include a conductive gasket 134. The conductive gasket 134 is held within the cavity 116 of the backshell 108 at least proximate to the cable opening 124. The conductive gasket 134 engages at least one of the walls 114 of the backshell 108. The conductive gasket 134 is electrically conductive, such that the gasket 134 is electrically connected to the backshell 108. In an embodiment, the conductive gasket 134 extends between the walls 114 of the backshell 108 along a plane 136 that is transverse to the cable axis 132. The plane 136 is shown in FIG. 1 as an axis because the illustrated diagram is a side view of the cable connector system 100. The plane 136 may be perpendicular to the cable axis 132. The cables 110 of the cable bundle 104 extend through the plane 136 defined by the conductive gasket 134. The conductive gasket 134 engages the cables 110 extending through the plane 136. In an exemplary embodiment, the conductive gasket 134 engages the grounding elements 208 (shown in FIG. 5) of the cables 110, which electrically connects the gasket 134 to each of the contacted cables 110. Since the gasket 134 is conductive and electrically connected to the backshell 108, the conductive gasket 134 provides electrical current paths 138 between each of the cables 110 and the backshell 108. The electrical current paths 138 between the cables 110 and the backshell 108 need not be the same for the various cables 110 that are spaced apart within the cavity 116. For example, some of the electrical current paths 138 may extend along different segments or portions of the conductive gasket 134 to the backshell 108 than other electrical current paths 138.

In an embodiment, the backshell 108 provides a path to ground 140. For example, the path to ground 140 may extend across the mounting end 122 of the backshell 108 and along the panel 126 to the ground 140. The electrical current paths 138 between each of the cables 110 and the backshell 108 further extend along the backshell 108 and the panel 126 to the ground 140, which individually grounds each of the cables 110. As such, the electrical current paths 138 may be electrical grounding paths that provide a reference for the individual cables 110.

In addition to engaging grounding elements 208 (shown in FIG. 5) of the cables 110, the conductive gasket 134 in an exemplary embodiment extends between the cables 110 and fills voids that separate the spaced-apart cables 110. For example, the conductive gasket 134 may be a conductive matrix that fills the voids between adjacent cables 110 and between the walls 114 and the cables 110 to enclose the cables 110 within the matrix. The conductive gasket 134 may be referred to herein as conductive matrix 134. As used herein, "gasket" refers to a mechanical seal that fills the space between two or more mating surfaces. Furthermore, "matrix" as used herein refers to a material in which something is at least partially enclosed and/or embedded. The conductive gasket 134 in an embodiment extends between the walls 114 and inbetween the cables 110 to seal the cavity 116 at or proximate to the cable end 120 of the backshell 108. The conductive gasket 134 effectively provides shielding from electrical interference, such as electromagnetic interference (EMI), radiofrequency interference (RFI), and the like.

Due to the shielding provided by the conductive gasket 134, the cable bundle 104 need not include a costly bulk cable shield that wraps around the cables 110. However, a bulk cable shield may be used for additional electrical shielding. For example, although not shown, the cable bundle 104 may include a bulk cable shield that encompasses the cables 110. An end of the bulk cable shield is configured to mechanically and electrically connect to the backshell 108. If the bulk cable shield connection to the backshell 108 fails, the shielding provided by the conductive gasket 134 greatly reduces the severity of any resulting shielding problems. For example, in some known connector assemblies, a bulk cable shield provides the only shielding at the opening of the backshell through which the cables extend and the only electrical connection between the cable bundle and the backshell. If the connection between the bulk cable shield and the backshell fails, a significant shielding issue results which significantly degrades performance of the connector assembly.

Figure 2:
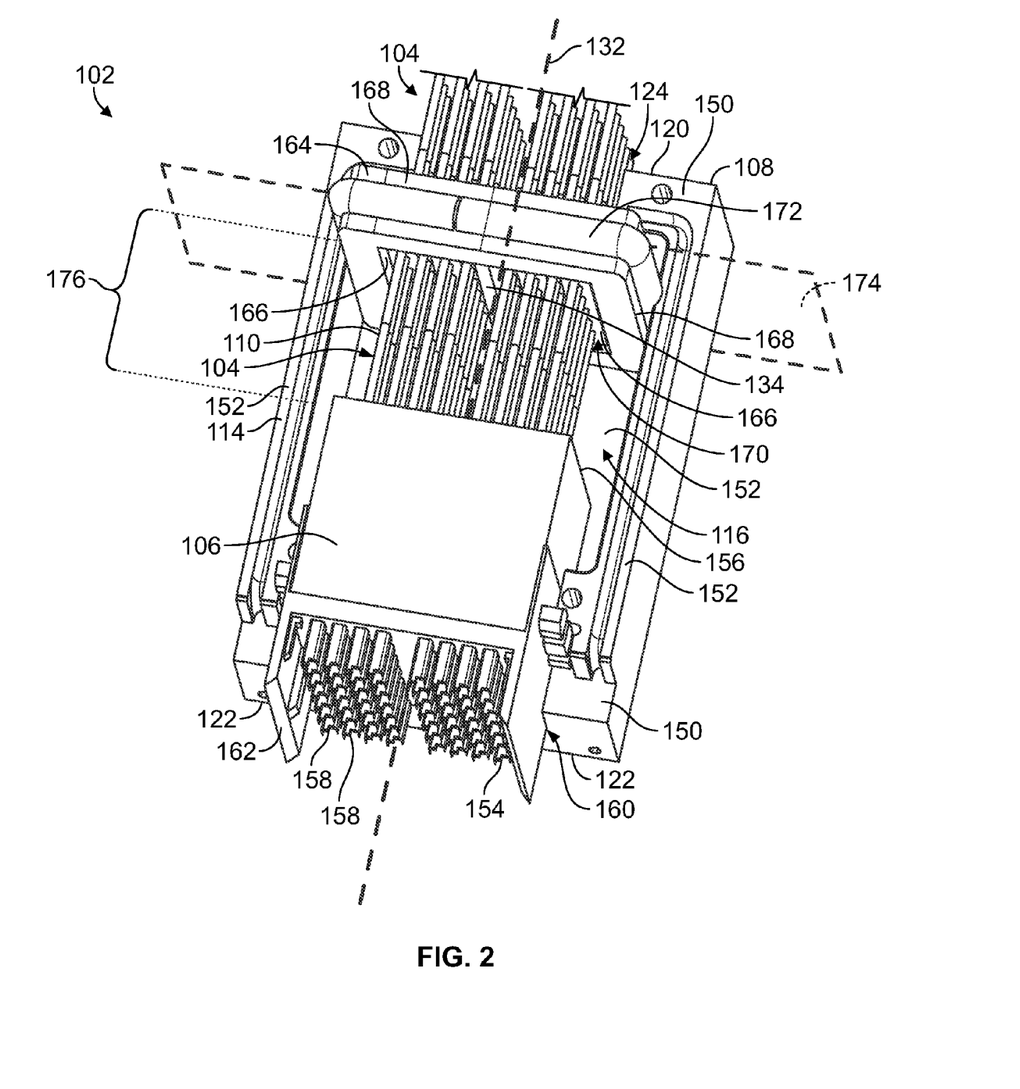
FIG. 2 is a perspective view of a connector assembly of the cable connector system according to an embodiment.

FIG. 2 is a perspective view of the connector assembly 102 according to an embodiment. Half of the backshell 108 is removed to show the components within the cavity 116. Optionally, the backshell 108 may be formed by mating a first shell and a second shell together at a seam, and the backshell 108 shown in FIG. 2 is one of the two shells.

In an embodiment, the walls 114 of the backshell 108 include end walls 150 and side walls 152. The end walls 150 are located at the cable end 120 and the mounting end 122 of the backshell 108. The side walls 152 each extend between the end walls 150. Although three side walls 152 are shown in FIG. 2, the assembled backshell 108 may include four side walls 152. The side walls 152 may extend parallel to the cable axis 132. The end walls 150 and side walls 152 may be perpendicular to one another such that the walls 150, 152 define a parallelepiped-shaped cavity 116. However, other orientations of the walls 150, 152 and other shapes of the cavity 116 are possible in alternative embodiments. The backshell 108 is manufactured from a metal material such that the backshell 108 is electrically conductive. The backshell 108, therefore, provides circumferential shielding for the cable connector 106 and cables 110 of the cable bundle 104 within the cavity 116.

The cable connector 106 has a front or mating end 154 and an opposite rear end 156. Relative or spatial terms such as "front," "rear," "top," "bottom," "left," or "right" are only used to distinguish the referenced elements and do not necessarily require particular positions or orientations in the cable connector system 100 (shown in FIG. 1) or in the surrounding environment of the cable connector system 100. The cable bundle 104 extends from the rear end 156. At the front end 154, the cable connector 106 has a mating interface configured to couple to the mating connector assembly. For example, the cable connector 106 may include plural ground shields 158 that surround mating contact portions 200 (shown in FIG. 4). The ground shields 158 are configured to engage corresponding grounding components of the mating connector assembly. The end wall 150 at the mounting end 122 of the backshell 108 may define a connector opening 160. The front end 154 of the cable connector 106 may extend at least partially through the connector opening 160 to allow the mating interface to couple to the mating connector assembly. Optionally, the cable connector 106 or the backshell 108 further includes a mechanical guide or organizer 162 at the connector opening 160. The mechanical guide 162 is configured to align the mating connector assembly relative to the cable connector 106 to ensure a proper electrical connection and reduce damage to the ground shields 158 and other mating components. Although only one cable connector 106 is shown in FIG. 2, in other embodiments the cavity 116 of the backshell 108 may be configured to accommodate two or more cable connectors 106. Although not shown, one or more mounting gaskets may be positioned between the mounting end 122 of the backshell 108 and the panel 126 (shown in FIG. 1) and/or between the cable connector 106 and the connector opening 160 to restrict EMI and/or RFI leakage through the connector opening 160.

In an embodiment, the conductive gasket 134 is electrically connected to the backshell 108 via a conductive frame 164. The frame 164 has inner walls 166 and outer walls 168. The inner walls 166 define a window 170. The cable bundle 104 extends through the window 170. The frame 164 extends along a plane 174. The plane 174 is transverse to the cable axis 132. For example, the plane 174 may be perpendicular to the cable axis 132. Furthermore, the plane 174 may be parallel or co-planar to the plane 136 (shown in FIG. 1) of the conductive gasket 134. The conductive gasket 134 is held within the window 170 between the inner walls 166. The conductive gasket 134 engages at least some of the inner walls 166. The outer walls 168 of the frame 164 engage the walls 114 of the backshell 108. For example, the outer walls 168 engage the side walls 152 in the illustrated embodiment because the frame 164 is located proximate to, but not within, the cable opening 124. However, in other embodiments the frame 164 may be disposed within the cable opening 124, and the outer walls 168 engage the end walls 150 that define the cable opening 124. The outer walls 168 may engage the walls 114 of the backshell 108 directly or indirectly via a conductive intermediary. In FIG. 2, a conductive perimeter gasket 172 extends along the outer perimeter of the frame 164 to allow the outer walls 168 to indirectly engage the walls 114 of the backshell 108. The perimeter gasket 172 provides an electrical current path between the frame 164 and the backshell 108. The perimeter gasket 172 further provides a seal between the outer walls 168 of the frame 164 and the walls 114 of the backshell 108. In an embodiment, the seal between the frame 164 and the backshell 108 prevents EMI and/or RFI leakage around the outside of the frame 164, and the conductive gasket 134 prevents EMI and/or RFI leakage through the window 170 within the frame 164.

In the illustrated embodiment, the frame 164 is spaced apart from the cable connector 106 by a distance 176. The cable bundle 104 extends across the distance 176 between the frame 164 and the cable connector 106. In an embodiment, the cables 110 of the cable bundle 104 are grounded and/or electrically commoned both within the frame 164 by engagement with the conductive gasket 134 and within the cable connector 106, as is described below. The distance 176 may represent a length between grounding locations. In other embodiments, the distance 176 may be more or less than what is shown in the illustrated embodiment. For example, in an alternative embodiment, the frame 164 may engage the cable connector 106 such that there is no distance therebetween.

Figure 3:
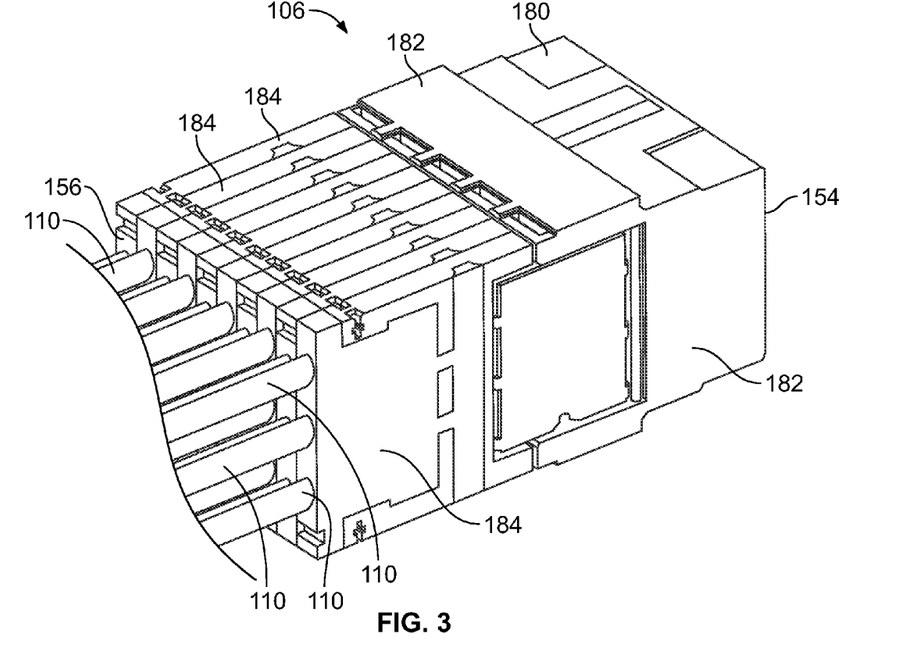
FIG. 3 is a rear perspective view of a cable connector of the connector assembly according to an embodiment.

FIG. 3 is a rear perspective view of the cable connector 106 of the connector assembly 102 (shown in FIG. 1) according to an embodiment. The cable connector 106 includes a dielectric housing 180 that defines at least part of the front end 154 of the cable connector 106. The housing 180 includes a plurality of support walls 182. A plurality of contact modules 184 are received in the housing 180 between the support walls 182. The contact modules 184 are stacked side-by-side. The contact modules 184 define the rear end 156 of the cable connector 106. Each contact module 184 includes multiple cables 110 that extend rearward from the contact module 184. Optionally, the contact modules 184 may be resiliently retained within discrete chambers of the housing 180, such as by a friction fit and/or barbs on the contact modules 184 or the housing 180.

Figure 4:
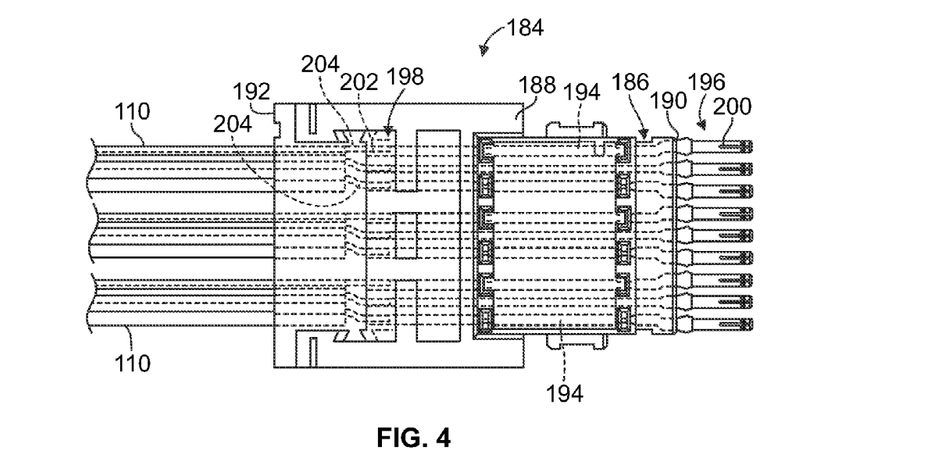
FIG. 4 illustrates a side view of a contact module of the cable connector that shows internal structures of the contact module in phantom.

FIG. 4 illustrates a side view of one of the contact modules 184 of the cable connector 106 that shows internal structures of the contact module 184, including an internal lead frame 186, in phantom. The contact module 184 includes a dielectric body 188 that surrounds the lead frame 186. In some embodiments, the body 188 is manufactured using an overmolding process. During the overmolding process, the lead frame 186 is encased in a dielectric material, such as a plastic material, which forms the body 188. As an alternative to overmolding, the body 188 may be assembled by coupling one or more components around the lead frame 186. In another alternative embodiment, the body 188 may receive individual contacts instead of surrounding a lead frame 186. The body 188 extends between a front end 190 and a rear end 192. Cables 110 extend rearward from the rear end 192.

The lead frame 186 includes a plurality of contacts 194 that extend between mating ends 196 and wire terminating ends 198. The mating ends 196 and the wire terminating ends 198 are provided at generally opposite ends of the contact module 184. However, the contacts 194 may be arranged in other configurations in alternative embodiments, such as along right angles. In an exemplary embodiment, the contacts 194 are arranged generally parallel to one another between the mating ends 196 and wire terminating ends 198. Mating contact portions 200 are provided at the mating ends 196. The mating contact portions 200 are configured to be loaded into contact cavities (not shown) of the housing 180 (shown in FIG. 3) for mating with corresponding mating contacts of the mating connector assembly. The contacts 194 define wire mating portions 202 proximate to the wire terminating ends 198. For example, the wire mating portions 202 of the contacts 194 may be solder pads configured to be soldered to corresponding inner conductors 204 of the cables 110. In other embodiments, the wire mating portions 202 may include insulation displacement contacts, wire crimp contacts, and the like, instead of or in addition to the solder pads for terminating the inner conductors 204 to the contacts 194.

Figure 5:
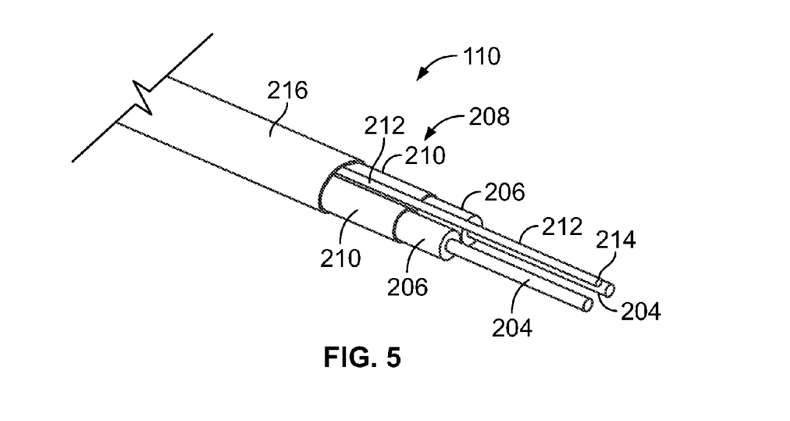
FIG. 5 is a perspective view of a cable of a cable bundle according to an embodiment.

FIG. 5 is a perspective view of one of the cables 110 of the cable bundle 104 (shown in FIG. 1) according to an embodiment. The cable 110 shown in FIG. 5 may be representative of all of the cables 110 in the cable bundle 104. Some of the layers and/or components of the cable 110 are shown extending beyond surrounding layers and/or components for descriptive purposes. The cable 110 includes two inner conductors 204 that are each surrounded by an insulation layer 206. The inner conductors 204 may be a differential pair used to convey differential signals. The cable 110 also includes a grounding element 208 for reference. The grounding element 208 in the illustrated embodiment includes both a shield layer 210 and a drain wire 212. The shield layer 210 may be a metallic foil, a metallic braid, and/or the like that wraps around the insulation layers 206. The drain wire 212 is a conductive metal wire that extends along the length of the cable 110. The drain wire 212 may electrically engage the shield layer 210, and an end of the drain wire 212 may be configured to terminate to a grounding contact (not shown) of the contact module 184 (shown in FIG. 4), to provide a ground path between the shield layer 210 and the contact module 184. The cable 110 also includes a cover layer 216 that surrounds the inner conductors 204 and the grounding element 208. The cover layer 216 is formed of a dielectric material and provides protection for the inner layers and/or components. In alternative embodiments, the cables 110 may have more or less than two inner conductors 204, different or additional grounding elements 208 than the shield layer 210 and the drain wire 212, and the like. As mentioned above, each of the cables 110 of the cable bundle 104 optionally may be grouped and commonly surrounded by additional layers, such as a bulk cable shield to provide additional shielding and an outer jacket to provide structure and protection from external forces.

Figure 6:
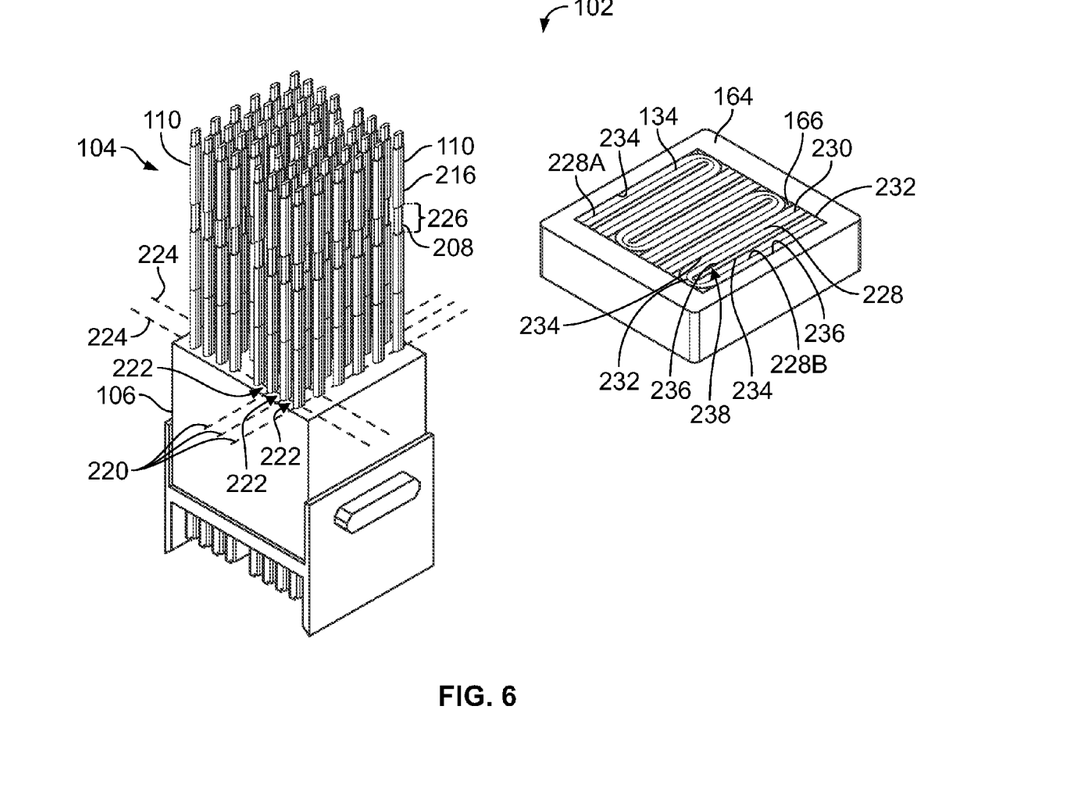
FIG. 6 is a partially exploded perspective view of the connector assembly formed in accordance with an embodiment.

FIG. 6 is a partially exploded perspective view of the connector assembly 102 formed in accordance with an embodiment. The backshell 108 (shown in FIG. 2) is not shown in FIG. 6. The connector assembly 102 is partially exploded because the conductive gasket 134 (also referred to as the conductive matrix 134) and the frame 164 are separated from the cable bundle 104 and the cable connector 106. The cables 110 of the cable bundle 104 are spaced apart from each other, at least within the cavity 116 (shown in FIG. 2) of the backshell 108. For example, the cables 110 may be oriented in an array of rows 220. Adjacent rows 220 may be parallel to each other and define a row void 222 therebetween. Optionally, the array may also include columns 224 of cables 110 that are transverse to the rows 220. In an exemplary embodiment, the grounding element 208 of each of the cables 110 is exposed along a portion of the cables 110 that engages the conductive gasket 134. For example, the cover layer 216 of each cable 110 may have a cutout portion 226 where the cover layer 216 is absent and the grounding element 208 is exposed. The cover layer 216 may be removed at the cutout portion 226, such as by cutting, melting, or the like. Alternatively, the cutout portion 226 of the cover layer 216 may be present upon forming the cover layer 216 when manufacturing the cable 110. When the connector assembly 102 is assembled, the conductive gasket 134 is configured to engage the grounding element 208 that is exposed through the cutout portion 226 to electrically connect the conductive gasket 134 to the grounding element 208 of each of the individual cables 110. For example, the conductive gasket 134 may engage one or both of the shield layer 210 (shown in FIG. 5) and the drain wire 212 (FIG. 5) that form the grounding element 208 in one or more embodiments. Since the conductive gasket 134 is electrically connected to the backshell 108 (for example, via the conductive frame 164) the conductive gasket 134 provides electrical current paths between each of the cables 110 and the backshell 108.

In an embodiment, the conductive gasket 134 has multiple strips or segments 228. Each strip 228 is configured to be received within a corresponding row void 222 between two rows 220 of cables 110. The strips 228 each have a first end 230 and an opposite second end 232. The strips 228 also have a left side 234 and a right side 236. The left side 234 of one strip 228 may be separated from the right side 236 of an adjacent strip 228 by a gap 238. A corresponding row 220 of cables 110 is received within the gap 238. The gaps 238 between adjacent strips 228 may be sized equal to or less than a width or thickness (for example, diameter) of the cables 110 such that the left and right sides 234 of the strips 228 engage the cutout portions 226 of the cables 110. In an embodiment, the conductive gasket 134 may be compressible such that the strips 228 at least partially deflect around the cables 110. For example, depending on the compressibility of the conductive gasket 134 and/or the width of the cables 110, the sides 234, 236 of adjacent strips 228 may engage each other at a seam instead of being separated by a gap 238. In an embodiment, adjacent strips 228 may be connected at the first ends 230 and/or the second ends 232. Strips 228 that are connected may be formed integrally as one piece or may be connected using an adhesive or a separate connector. Optionally, adjacent strips 228 may be connected at only one of the ends 230, 232 such that the conductive gasket 134 follows a winding course within the frame 164. In another example, adjacent strips 228 may be connected at both ends 230, 232 such that the conductive gasket 134 forms a lattice or web within the frame 164. The ends 230, 232 of the conductive gasket 134 may engage the inner walls 166 of the frame 164. Furthermore, the left side 234 of the left-most strip 228A and the right side 236 of the right-most strip 228B may engage the inner walls 166.

Figure 7:
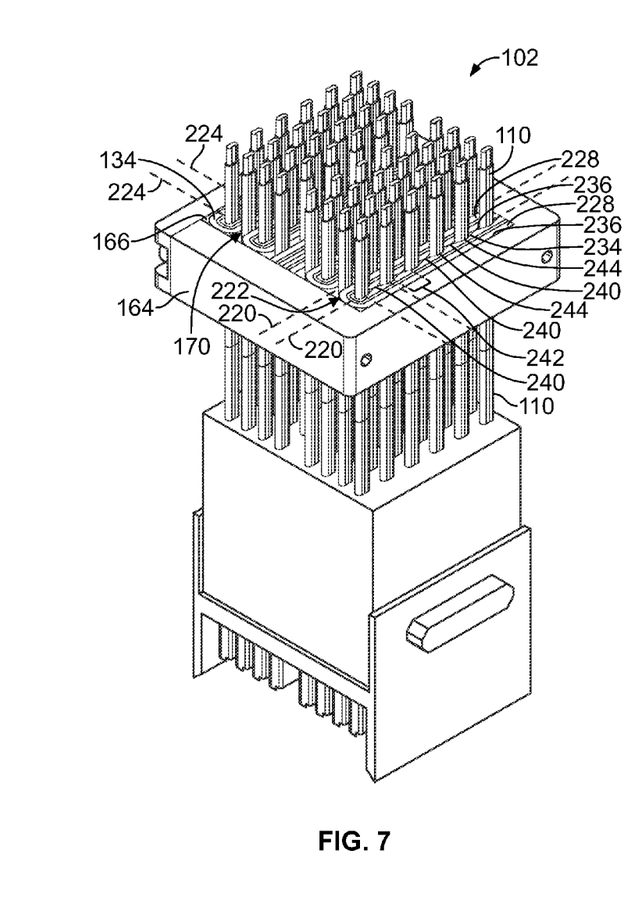
FIG. 7 is a perspective view of the connector assembly according to an exemplary embodiment.

FIG. 7 is a perspective view of the connector assembly 102 according to an exemplary embodiment. The backshell 108 (shown in FIG. 2) is not shown in FIG. 7. In an embodiment, the conductive gasket 134 has a tubular shape. The conductive gasket 134 may be a fabric over foam tube that includes a conductive fabric sleeve that surrounds a compressive foam. The foam allows the conductive gasket 134 to be compressible. Alternatively, the conductive gasket 134 may be composed of a compressive foam material that includes a metal particles or wires embedded therein. The metal particles may extend through the gasket 134 which allows the gasket 134 to be electrically conductive.

The strips 228 of the conductive gasket 134 may at least substantially fill the corresponding row voids 222 between the rows 220 of cables 110. In an embodiment, the strips 228 have projections 240 that are spaced along at least one of the left or right sides 234, 236 of the strips 228. The projections 240 may extend into corresponding cable spacings 242 between adjacent cables 110 in the same row 220. The cable spacing 242 is the space between two adjacent cables 110 in the same row 220. The two adjacent cables 110 are in different columns 224. For example, projections 240 on the left side 234 of one strip 228 may extend through the corresponding cable spacings 242 and engage the right side 236 of the adjacent strip 228 on the other side of the row 220 of cables 110. Optionally, the right side 236 of the adjacent strip 228 may also include projections 240 that extend at least partially into the cable spacings 242 and engage the projections 240 on the left side 234 of the one strip 228. The strips 228 therefore may at least substantially fill both the row voids 222 and the cable spacings 242, so the conductive gasket 134 encloses the cables 110. For example, the cables 110 may be embedded within the conductive gasket or matrix 134. In addition, the conductive gasket or matrix 134 may also fill voids between the cables 110 and the inner walls 166 of the frame 164 (or the walls 114 of the backshell 108 (both shown in FIG. 2) if the frame 164 is not used). The conductive gasket 134 therefore may substantially seal the window 170 of the frame 164 to restrict EMI and/or RFI leakage through the cavity 116 (shown in FIG. 2) of the backshell 108.

In the illustrated embodiment, the conductive gasket 134 is compressible and the projections 240 are formed based on the conductive gasket 134 deflecting around the cables 110. For example, the areas of the conductive gasket 134 that engage the cables 110 at least partially compress due to the force exerted by the cables 110, and are referred to as compressed areas 244. Each strip 228 includes multiple compressed areas 244 where the strip 228 engages the cables 110. The projections 240 may be uncompressed areas of the strips 228 that are located between the compressed areas 244. The uncompressed areas extend at least partially into the cable spacings 242 because the uncompressed areas are not compressed by the cables 110. In other embodiments, the conductive gasket 134 may be compressible and also include pre-defined projections 240 that are defined when the gasket 134 is not compressed by the cables 110.

In an alternative embodiment, instead of being compressible and tubular-shaped, the conductive gasket 134 may include a series of rigid conductive plates (not shown). For example, each strip 228 may be an individual plate that extends within and substantially fills the row voids 222. Like the described conductive gasket 134, the plates may define projections along the sides that are configured to at least partially fill the cable spacings 242 between the cables 110 in the same row 220 to enclose the cables 110. The conductive plates may be formed of metal, a metal-plated plastic, or a conductive plastic formulation.

In another alternative embodiment, the conductive gasket 134 may be a conductive substrate overmold (not shown). For example, the cutout portions 226 (shown in FIG. 6) of the cables 110 may be overmolded with a conductive substrate. The conductive substrate includes a conductive filler that allows the gasket 134 to be electrically conductive. During the overmolding process, the conductive substrate seals around and embeds the cables 110.

Figure 8:
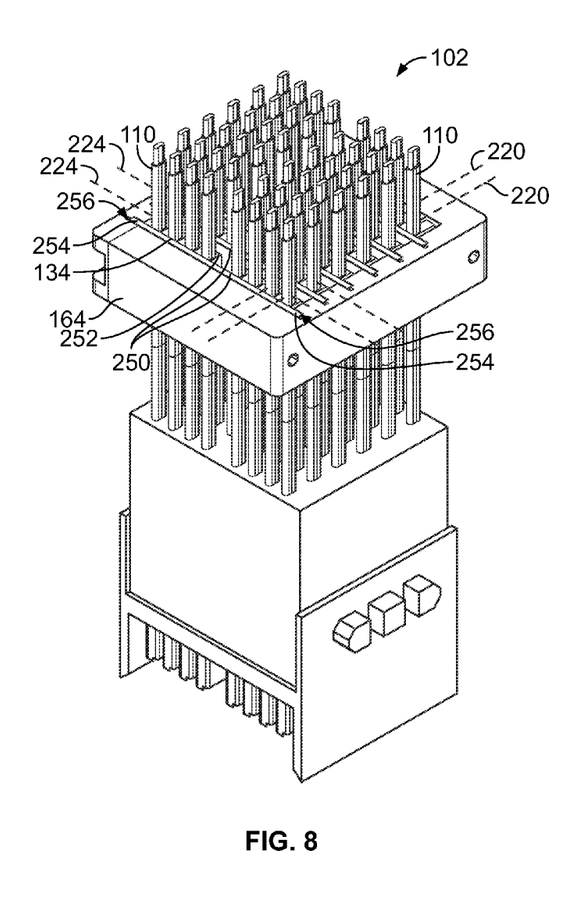
FIG. 8 is a perspective view of the connector assembly according to an alternative embodiment.
Figure 9:
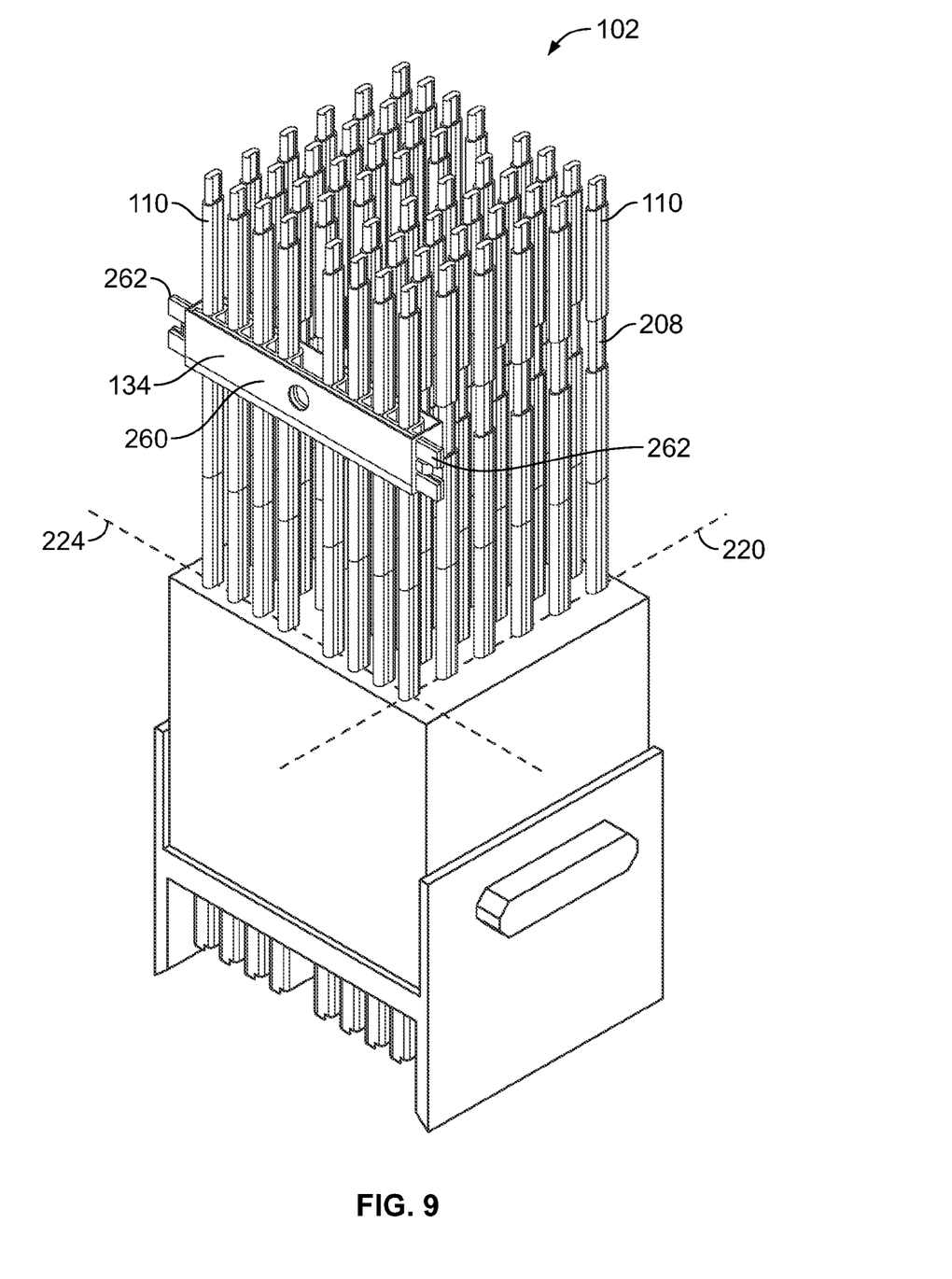
FIG. 9 is a perspective view of the connector assembly according to another alternative embodiment.

FIGS. 8 and 9 are perspective views of additional alternative embodiments of the connector assembly 102 that include different conductive gaskets 134 than the conductive gasket 134 shown in FIG. 7. In FIG. 8, the conductive gasket 134 is a series of metal combs 250. The combs 250 are disposed parallel to each other between the rows 220 or the columns 224 of the cables 110. In the illustrated embodiment, the combs 250 extend between the columns 224. Ends 254 of the combs 250 are received in slots 256 of the frame 164. The combs 250 engage the grounding element 208 (shown in FIG. 6) of the cables 110 in the proximate row 220 or column 224. Optionally, the combs 250 may be soldered to the cables 110 via solder sleeves 252. In FIG. 9, the conductive gasket 134 is a series of metal clips 260, although only one clip 260 is shown. Each metal clip 260 may engage each cable 110 in a row 220 or column 224 of cables 110. The metal clip 260 in the illustrated embodiment engages a column 224 of cables 110. The metal clip 260 may be secured to the grounding element 208 of the cables 110 via soldering, hot melt overmolding, or the like. Ends 262 of the clips 260 may engage the frame 164 (shown in FIG. 8) or the backshell 108 (shown in FIG. 2) to provide an electrical current path between the individual cables 110 and the backshell 108.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

What is claimed is:
1. A connector assembly comprising:
a cable bundle including a plurality of cables, the cables each having at least one inner conductor, a grounding element, and a cover layer that surrounds the at least one inner conductor and the grounding element;
a backshell having walls defining a cavity, the cavity receiving a terminating end of the cable bundle, the backshell having a cable end, the cable bundle extending from the backshell through a cable opening at the cable end; and a conductive gasket held within the cavity of the backshell at least proximate to the cable opening, the conductive gasket being electrically connected to the backshell, the conductive gasket extending between the cables of the cable bundle, the conductive gasket engaging the grounding element of each of the cables to provide electrical current paths between the cables and the backshell;
wherein the conductive gasket is electrically connected to the backshell via a conductive frame, the conductive frame having inner walls defining a window and outer walls that engage the walls of the backshell at least one of directly or indirectly via a perimeter gasket, the cable bundle extending through the window, the conductive gasket held within the window between the inner walls and engaging the cables within the window.

2. The connector assembly of claim 1, wherein the terminating end of the cable bundle is terminated to a cable connector within the cavity of the backshell, the backshell including a mounting end that defines a connector opening, the cable connector having a mating interface that extends at least partially through the connector opening for mating to a mating connector.

3. The connector assembly of claim 1, wherein the cover layer of each cable has a cutout portion where the cover layer is absent and the grounding element is exposed, the conductive gasket engaging the grounding element through the cutout portion of the cover layer.

4. The connector assembly of claim 1, wherein the grounding element of each cable is at least one of a shield layer that surrounds the at least one inner conductor or a drain wire.

5. The connector assembly of claim 1, wherein the backshell provides a path to ground, the electrical current paths between the cables and the backshell further extending to the ground to individually ground each of the cables.

6. The connector assembly of claim 1, wherein the cable bundle includes a bulk shield layer that encompasses the plurality of cables, an end of the bulk shield layer is configured to mechanically and electrically connect to the backshell.

7. The connector assembly of claim 1, wherein the conductive gasket is at least one of a substrate overmold, a fabric over foam tube, a series of plates, a series of combs, or a series of clips.

8. The connector assembly of claim 1, wherein the cables are oriented in an array of rows, the conductive gasket filling row voids defined between adjacent rows of cables and between the cables and the walls of the backshell to restrict electromagnetic interference (EMI) leakage through the cavity of the backshell.

9. The connector assembly of claim 8, wherein the conductive gasket has a tubular shape that follows a winding course through the row voids between the rows of cables.

10. A connector assembly comprising:
a cable bundle including a plurality of cables, the cables each having at least one inner conductor, a grounding element, and a cover layer that surrounds the at least one inner conductor and the grounding element, the cables being oriented in an array of rows;
a backshell having walls defining a cavity, the cavity receiving a terminating end of the cable bundle, the backshell having a cable end, the cable bundle extending from the backshell through a cable opening at the cable end; and
a conductive gasket held within the cavity of the backshell at least proximate to the cable opening, the conductive gasket being electrically connected to the backshell, the conductive gasket extending between the cables of the cable bundle, the conductive gasket engaging the grounding element of each of the cables to provide electrical current paths between the cables and the backshell;
wherein the conductive gasket is compressible, compressed areas of the conductive gasket engage the cables of the cable bundle and uncompressed areas of the conductive gasket extend at least partially into a cable spacing between adjacent cables in the same row, wherein uncompressed areas of a first segment of the conductive gasket on one side of one row of cables engage uncompressed areas of a second segment of the conductive gasket on an opposite side of the row of cables to enclose the cables.

11. The connector assembly of claim 10, wherein the conductive gasket is electrically connected to the backshell via a conductive frame, the conductive frame having inner walls defining a window and outer walls that engage the walls of the backshell at least one of directly or indirectly via a perimeter gasket, the cable bundle extending through the window, the conductive gasket held within the window between the inner walls and engaging the cables within the window.

12. The connector assembly of claim 10, wherein the array of rows define row voids between adjacent rows, the conductive gasket having multiple strips that each fill a corresponding row void, the multiple strips having projections along at least one of first or second sides of the strips, the projections extending at least partially into the cable spacing between adjacent cables in the same row.

13. A connector assembly comprising:
a backshell having walls defining a cavity, the backshell having a cable end that defines a cable opening and a mounting end that defines a connector opening;
a cable connector within the cavity of the backshell, the cable connector having a mating interface that extends at least partially through the connector opening;
a cable bundle including a plurality of cables, the cable bundle having a terminating end within the cavity that terminates to the cable connector, the cables extending generally parallel to a cable axis within the cavity, the cable bundle extending from the backshell through the cable opening; and
a conductive matrix held within the cavity of the backshell at least proximate to the cable opening, the conductive matrix extending between the walls of the backshell along a plane transverse to the cable axis, the conductive matrix engaging the cables and filling voids between the cables to enclose the cables and seal the cavity;
wherein the cables within the cavity are spaced apart in an array of rows that define row voids between adjacent rows, the conductive matrix having multiple strips that fill the corresponding row voids, the multiple strips having projections along at least one of first or second sides of the strips, the projections extending at least partially into a cable spacing between adjacent cables in the same row.

14. The connector assembly of claim 13, wherein the strips of the conductive matrix have a first end and an opposite second end, at least one of the first ends or the second ends of adjacent strips being connected.

15. The connector assembly of claim 13, wherein the conductive matrix is compressible and areas of the conductive matrix that engage the cables at least partially deflect around the corresponding cables.

16. The connector assembly of claim 13, wherein the conductive matrix is electrically connected to the backshell via a conductive frame, the conductive frame having inner walls defining a window, the cable bundle extending through the window, the conductive matrix held within the window between the inner walls, the conductive frame having outer walls that engage the walls of the backshell at least one of directly or indirectly via a perimeter gasket.

17. The connector assembly of claim 13, wherein the conductive matrix is at least one of a substrate overmold, a fabric over foam tube, a series of plates, a series of combs, or a series of clips.

18. The connector assembly of claim 13, wherein the cables each have at least one inner conductor, a grounding element, and a cover layer that surrounds the at least one inner conductor and the grounding element, the conductive matrix being electrically connected to the backshell, the conductive matrix engaging the grounding elements of the cables to provide electrical current paths between each of the cables and the backshell.

19. The connector assembly of claim 18, wherein the cover layer of each cable has a cutout portion where the cover layer is absent and the grounding element is exposed, the conductive matrix engaging the grounding element through the cutout portion of the cover layer.

20. The connector assembly of claim 18, wherein the mounting end of the backshell is configured to be mounted to a panel that provides a path to ground, the electrical current paths between each of the cables and the backshell configured to further extend through the panel to the ground upon mounting the backshell to the panel to individually ground each of the cables.

\* \* \* \* \*